(12) United States Patent
Benamrouche

(10) Patent No.: US 11,362,695 B2
(45) Date of Patent: Jun. 14, 2022

(54) METHOD FOR COMMUNICATION BETWEEN A PORTABLE DEVICE COMPRISING A TOUCH-SENSITIVE SURFACE AND A PERIPHERAL DEVICE SELECTED BY A DIRECTIONAL SLIDE ON THE TOUCH-SENSITIVE SURFACE

(71) Applicant: SAGEMCOM BROADBAND SAS, Rueil-Malmaison (FR)

(72) Inventor: Farid Benamrouche, Rueil Malmaison (FR)

(73) Assignee: SAGEMCOM BROADBAND SAS, Rueil Malmaison (FR)

( * ) Notice: Subject to any disclaimer, the term of this patent is extended or adjusted under 35 U.S.C. 154(b) by 0 days.

(21) Appl. No.: 16/688,683

(22) Filed: Nov. 19, 2019

(65) Prior Publication Data
US 2020/0162118 A1      May 21, 2020

(30) Foreign Application Priority Data
Nov. 20, 2018   (FR) ...................... 18 71612

(51) Int. Cl.
| | |
|---|---|
| *G06F 3/04883* | (2022.01) |
| *H04W 4/02* | (2018.01) |
| *G06F 3/0488* | (2022.01) |
| *G01S 5/06* | (2006.01) |
| *H04B 1/20* | (2006.01) |
| *H04M 11/00* | (2006.01) |
| *H04N 21/41* | (2011.01) |

(52) U.S. Cl.
CPC .......... *H04B 1/202* (2013.01); *G06F 3/04883* (2013.01); *H04M 11/007* (2013.01); *H04N 21/4126* (2013.01)

(58) Field of Classification Search
None
See application file for complete search history.

(56) References Cited

U.S. PATENT DOCUMENTS

| | | | |
|---|---|---|---|
| 2012/0127012 A1 | 5/2012 | Gicklhorn et al. | |
| 2013/0169546 A1 | 7/2013 | Thomas et al. | |
| 2015/0326704 A1* | 11/2015 | Ko | H04M 1/72572 455/456.3 |
| 2017/0090711 A1* | 3/2017 | Bostick | H04W 4/02 |

* cited by examiner

*Primary Examiner* — Curtis A Kuntz
*Assistant Examiner* — Jerold B Murphy
(74) *Attorney, Agent, or Firm* — Muncy, Geissler, Olds & Lowe, P C.

(57) ABSTRACT

Method for communication between a portable device comprising a touch-sensitive surface and a peripheral device selected from among at least one peripheral device, comprising the steps of: determining a current position and a current orientation of the portable device; determining a direction of a selection slide on the touch sensitive surface of the portable device, carried out by an individual's finger or by any object; defining, from among the at least one peripheral device, the selected peripheral device whose position corresponds to the direction of the selection slide; starting a communication between the portable device and the selected peripheral device.

13 Claims, 2 Drawing Sheets

[Fig.1]
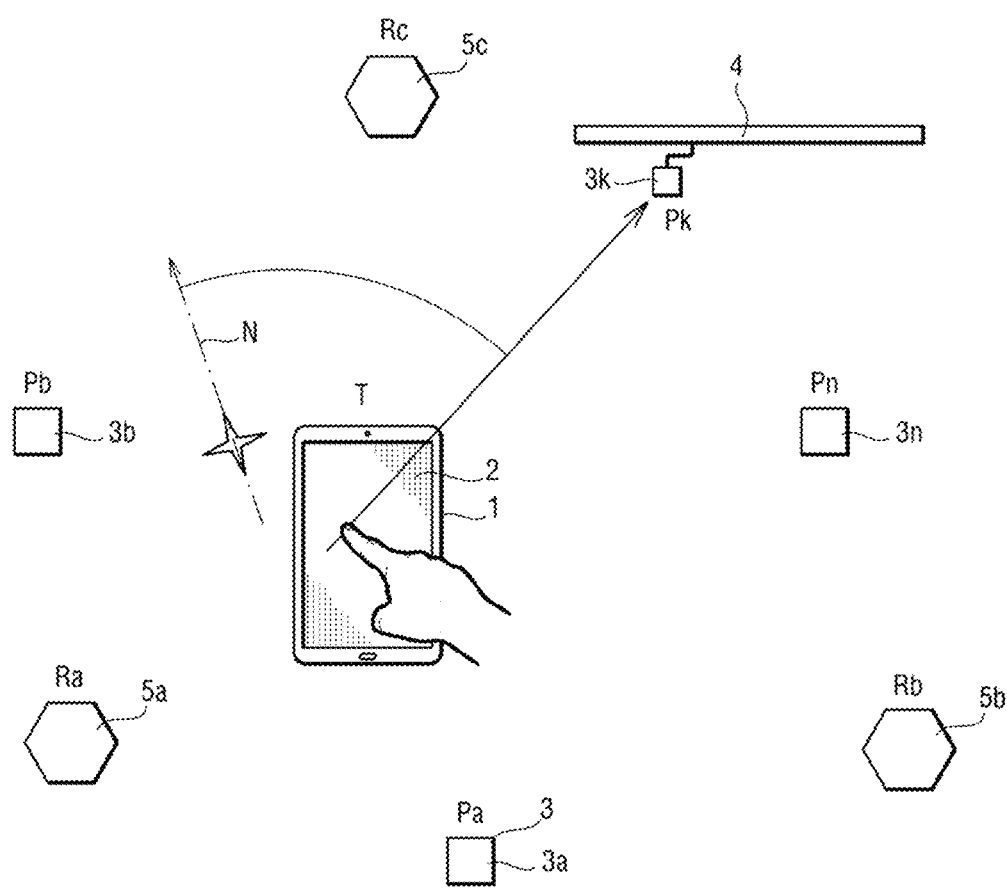

[Fig.2]
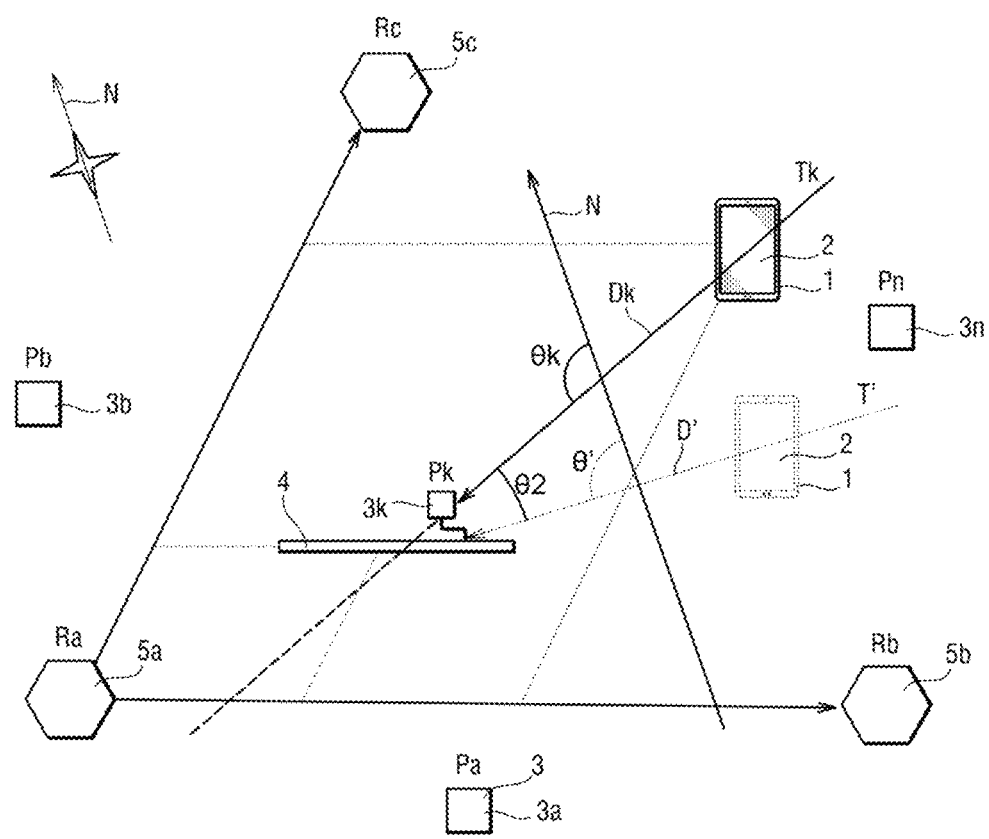

METHOD FOR COMMUNICATION BETWEEN A PORTABLE DEVICE COMPRISING A TOUCH-SENSITIVE SURFACE AND A PERIPHERAL DEVICE SELECTED BY A DIRECTIONAL SLIDE ON THE TOUCH-SENSITIVE SURFACE

The invention relates to the field of methods for communication between a portable device comprising a touch-sensitive surface and a peripheral device selected by a directional slide on the touch-sensitive surface.

BACKGROUND OF THE INVENTION

Some recently developed set-top boxes are capable of communicating with devices other than a television set, in order to implement new functions and to facilitate their use.

These devices are for example portable devices: tablet, smartphone, portable computer, smartwatch, etc.

Among these new functions, there is henceforth the possibility of viewing video content on a smartphone or on a tablet, and of transferring the video content to the set-top box in order to continue viewing the video content on the television set which is connected to the set-top box.

This type of transfer is not of course solely a transfer of video content to a set-top box: any type of multimedia content can be transferred from a portable device to any type of peripheral device. As has been seen, the multimedia content can be a video transferred to a set-top box, but it can also be a video transferred to a dongle connected directly to a television set, or it can also be an audio content transferred to a connected loud speaker, etc.

The interfaces proposed for carrying out this type of transfer are generally not very user-friendly and are complicated to use, above all for certain people, such as old people, who are not used to using such devices. In particular, the selection of the peripheral device to which it is desired to transfer a multimedia content is not very practical and not very instinctive to carry out.

PURPOSE OF THE INVENTION

The purpose of the invention is to select, in a simple, user-friendly and instinctive manner, a peripheral device with which it is desired that a portable device should establish a communication.

SUMMARY OF THE INVENTION

In order to achieve this objective, there is proposed a method for communication between a portable device comprising a touch-sensitive surface and a peripheral device selected from among at least one peripheral device, comprising the steps of:
  determining a current position of the portable device, and a current orientation of the portable device relative to a reference direction;
  determining a direction of a selection slide on the touch-sensitive surface of the portable device, carried out by an individual's finger or by any object, the direction of the selection slide being relative to the reference direction;
  defining, from among the at least one peripheral device, the selected peripheral device whose position corresponds to the direction of the selection slide;
  starting a communication between the portable device and the selected peripheral device.

The expression "the selected peripheral device whose position corresponds to the direction of the selection slide" is understood to mean that the selection slide is carried out in the direction of the real and current position of the selected peripheral device.

Thus, in order to select the peripheral device with which it is desired that the portable device should establish a communication, for example a transfer of multimedia content, it suffices to perform a slide on the touch-sensitive surface of the portable device in the direction of the selected peripheral device. The selection of the peripheral device is therefore at the same time simple, user-friendly and instinctive.

There is also proposed a portable device, comprising a processing component in which the communication method which has just been described is implemented.

There is moreover proposed a computer program comprising instructions for implementing, by a processing component of a portable device, the communication method which has just been described.

Storage means are moreover proposed, characterized in that they store a computer program comprising instructions for implementing, by a processing component of a portable device, the communication method which has just been described.

The invention will be better understood in the light of the following description of an embodiment of a particular and non-limiting implementation of the invention.

BRIEF DESCRIPTION OF THE DRAWINGS

Reference will be made to the appended drawings, among which:

FIG. 1 shows a tablet, peripheral devices comprising a set-top box connected to a television set and three reference devices;

FIG. 2 shows the tablet, the set-top box, the television set and the three reference devices, as well as a reference direction and directions of slides carried out during the use of the communication method according to the invention.

DETAILED DESCRIPTION OF THE INVENTION

With reference to FIG. 1, the communication method according to the invention is implemented in a portable device 1 comprising a touch-sensitive surface. The touch-sensitive surface in this case is part of a touch-sensitive screen 2 of the portable device 1.

In this case the portable device 1 is a tablet 1. The tablet 1 comprises communication components allowing it to exchange data according to the Bluetooth standard.

The tablet 1 comprises moreover a processing component.

In this case the processing component is a processor, but could be a different component, for example a microcontroller, an FPGA, an ASIC, etc. The processor is suitable for executing instructions of a program for implementing the communication method according to the invention.

In this case the tablet 1 is carried by an individual who is in his house.

The individual's house comprises at least one, in this case a plurality of peripheral devices 3a, . . . , 3n, whose respective positions are Pa, . . . , Pn. Among these peripheral devices 3, there is notably a set-top box 3k which is connected to a television set 4.

In the individual's house, there is moreover a first reference device 5a, a second reference device 5b, and a third reference device 5c. The first reference device 5a is a connected loud speaker, the second reference device 5b is a home cinema amplifier and the third reference device 5c is a residential gateway.

The three reference devices 5 all comprise communication components allowing them to exchange data according to the Bluetooth standard.

The communication method according to the invention notably necessitates the determination of the position of certain devices and notably that of the tablet 1.

In this case the position T of the tablet 1 is determined by Bluetooth triangulation, in a frame of reference defined by the positions of at least three reference devices, in this case by the position Ra of the first reference device 5a, by the position Rb of the second reference device 5b, and by the position Rc of the third reference device 5c. The first reference device 5a, the second reference device 5b and the third reference device 5c therefore act as Bluetooth beacons allowing the geographic location of the tablet 1.

In this case the Bluetooth triangulation uses RSSI (Received Signal Strength Indication) measurements. When any receiving device receives a Bluetooth signal transmitted by any transmitting device, the RSSI evaluated by the receiving device is a measurement of the received power of the signal, which is representative of the distance between the receiving device and the transmitting device.

In this case the triangulation used makes use of the principle of the angle of arrival (or AoA, standing for Angle of Arrival).

The first reference device 5a and the second reference device 5b form the base of a triangle.

The origin of the frame of reference is the position of the first reference device 5a, whose coordinates in the frame of reference are (0; 0).

An RSSI measurement is produced by the first reference device 5a or by the second reference device 5b. A value M(5a, 5b) is obtained from this RSSI measurement. The value M(5a, 5b) is a value of power representative of the distance between the first reference device 5a and the second reference device 5b. This power value represents the unit used in the frame of reference. The "distance measurements" produced in this case are therefore in reality measurements of relative powers expressed as a function of the value M(5a, 5b).

It is considered that the tablet 1 is in the position T which forms the third apex of the triangle Ra, Rb, T.

A value M(5a, 1) and a value M(5b, 1) are obtained. These values are power values which are respectively representative of the distance between the first reference device 5a and the tablet 1, and of the distance between the second reference device 5b and the tablet 1.

The values M(5a, 5b), M(5a, 1) and M(5b, 1), together with the conventional trigonometric relationships, are then used for computing the angles RaRbT and RbRaT.

The position T of the tablet 1 is thus obtained, without it being necessary to know the distance in a metric frame of reference between the first reference device 5a and the second reference device 5b.

In order to improve the accuracy of the position T of the tablet 1, these measurements are repeated with the third reference device Rc in order to carry out a triangulation.

It is noted that this method can of course be used for evaluating the position of other devices.

The use of the communication method according to the invention will now be described in a more precise manner, with reference to FIG. 2.

The communication method starts with a preliminary calibration phase.

During this preliminary calibration phase, the tablet 1 detects all of the peripheral devices 3 present in the network (comprising the set-top box 3k). This detection uses any type of detection protocol, for example the UPnP (Universal Plug and Play) protocol, the AirPlay protocol, etc. The tablet 1 places the identifiers of these peripheral devices 3 in a list of peripheral devices 3.

Then, the tablet 1 acquires the positions Pa, . . . , Pn of each peripheral device 3a, . . . , 3n.

If a peripheral device 3 is capable of exchanging data by Bluetooth, the peripheral device 3 itself determines its position P by triangulation, in the frame of reference mentioned above, and transmits it to the tablet 1.

If the peripheral device 3 in question cannot exchange data by Bluetooth, or if the peripheral device 3 cannot be geographically located in the frame of reference for any other reason, the tablet 1 requests the individual to position the tablet 1 in the immediate proximity of the peripheral device 3, for example on the peripheral device 3. The tablet 1 then requests the individual to carry out an action, such as for example pressing a button or a surface of the touch-sensitive screen 2 of the tablet 1, in order to validate the position in which the tablet 1 is located. The tablet 1 then acquires its own position and considers that its own position corresponds to the position of the peripheral device 3.

Alternatively, the position of one or more peripheral devices 3 could be determined using a camera positioned such that it can see the peripheral devices 3 and acquire images of those peripheral devices 3 making it possible to locate them.

Then, for each peripheral device 3, the tablet 1 asks the individual to position himself (and thus to position the tablet 1) in any calibration position, for example in the middle of the room in which the peripheral devices 3 are located, and to carry out a calibration slide with a finger or with any object (for example a stylus) on the touch-sensitive screen 2 of the tablet 1, in such a way that a direction of calibration slide aims at the said peripheral device 3.

The tablet 1 acquires, saves and associates, with the peripheral 3, the calibration position as well as a calibration slide angle between the reference direction N and the direction of the calibration slide. The reference direction N is the magnetic north.

For example, for the set-top box 3k, the calibration position of the tablet 1 in FIG. 2 is the position Tk, the calibration slide angle is the angle θk, and the direction of the calibration slide is the direction Dk.

After this calibration phase, the individual can use his tablet 1 for selecting, by sliding on the touch-sensitive screen 2, a peripheral device selected from among the other peripheral devices 3, to which he wishes to transfer a multimedia content or else, more generally, with which he wishes the tablet 1 to establish a communication.

The selected peripheral device in this case is the set-top box 3k connected to the television set 4. The individual carrying the tablet 1 in fact wishes to transfer a video content to the set-top box 3k in order to play the video content on the television set 4. It is noted that the video content can be stored in the tablet 1 in the form of a video file, but can also be in the process of reception by the tablet 1 via a video stream coming for example from the internet network.

The communication method then comprises the step of determining a current position and a current orientation of the tablet 1.

"Current" position and orientation is understood to mean the position and the orientation of the tablet 1 at the time when the individual decides to start the transfer to the set-top box 3k.

The current orientation of the tablet 1 is produced by means of a compass present in the tablet 1, which gives an orientation with respect to the reference direction N. The current orientation of the tablet 1 is therefore relative to the reference direction N.

The current position of the tablet 1 corresponds to the position T' in FIG. 2.

The individual then carries out a selection slide on the touch-sensitive screen 2 of the tablet 1, in the direction of the selected device, that is to say of the set-top box 3k (or of the television set 4). The individual carries out the selection slide with one of his fingers or with an object, for example with a stylus.

The tablet 1 acquires the direction of the selection slide D', as well as the angle of the selection slide θ' between the reference direction N and the direction of the selection slide D'. The direction of the selection slide D' is relative to the reference direction N.

The tablet 1 then defines the selected peripheral device from among the peripheral devices P of the individual's house, that is to say in this case the set-top box 3k, whose position corresponds to the direction of the selection slide D'.

The selected peripheral device is defined as follows.

The tablet 1 has already detected all of the peripheral devices 3 and has placed their identifiers in a list of peripheral devices 3. The tablet 1 attempts to verify, for each peripheral device 3, one after the other, if the said peripheral device 3 is the selected peripheral device.

For each peripheral device 3, and therefore in this case for the set-top box 3k, the tablet 1 determines that the position of the said peripheral device (that is to say of the set-top box 3k) corresponds to the direction of the selection slide D', and therefore that the said set-top box 3k is the selected peripheral device, when |θ2−θ2'|<ε, where ε is a predetermined angular threshold (or an error), and where:

$$\theta 2 = \arccos(((TkPk)^\wedge 2 + (T'Pk)^\wedge 2 - (TkT')^\wedge 2)/(2*(TkPk)*(T'Pk))),$$

and where:

$$\theta 2' = \theta k - \theta';$$

Tk is the calibration position associated with the set-top box 3k;
Pk is the position of the set-top box 3k;
TkPk is the segment between Tk and Pk;
T' is the current position of the tablet 1;
T'Pk is the segment between T' and Pk;
TkT' is the segment between Tk and T';
θk is the calibration slide angle associated with the set-top box 3k;
θ' the selection slide angle between the reference direction N and the direction of the selection slide D'.

If |θ2−θ2'|<ε, that is to say if the selection slide angle θ' correctly corresponds to the set-top box 3k, which is therefore the selected peripheral device 3, a communication starts between the tablet 1 and the set-top box 3k: the tablet 1 begins to transfer the video content to the set-top box 3k.

If the selection slide angle θ' does not correspond to the set-top box 3k, the computations which have just been described are repeated for the next peripheral device in the list of peripheral devices.

The computation of θ2 is then reiterated. The value of θ' itself is not of course modified because the selection slide is indeed valid (even if it does not correspond to the peripheral device in question). Similarly, the value of T' is not modified, because the tablet 1 does not move.

It is noted that the predetermined angular threshold ε can be adjustable.

The predetermined angular threshold ε is estimated using the least favourable plausible configuration.

Taking a distance of 10 m between the tablet 1 and the set-top box 3k and a maximum error of 30 cm in the aim, a margin of error is obtained for the angle of about 1.5°, that is to say a predetermined angular threshold ε equal to 1.5°.

It is noted that it is perfectly possible to modify the position of one of the reference devices 5, without carrying out the calibration steps again, if there are at least four reference devices 5 in the system of coordinates defining the frame of reference used. This implies however that only one single reference device 5 is moved at the same time and that it is given the time to start.

The coordinates of the peripheral devices 3 are recalculated via a translation RbRb' (if it is the reference device 5b that has moved from the position Rb to the position Rb').

It is also perfectly possible to modifier the position Pi of one of the peripheral devices 3i, provided that only one of them is moved at the same time and that it is given the time to reconfigure itself.

If the peripheral device 3i is set up for exchanging data by Bluetooth, its position is redefined automatically. If that is not the case, it is necessary to move the tablet 1 close to the peripheral device 3i again in order to determine its new position.

Once the new position Pi' of the peripheral device 3i is known, it suffices to compute the angle α between the straight lines (TPi) and (TPi'). This computation uses the conventional trigonometric relationships, knowing that all of the distances of the triangle TPiPi' are known.

A new calibration slide angle θi" is then derived:

θi"=θi−α, where θi is the calibration slide angle associated with the peripheral device 3i.

The invention is not of course limited to the described embodiment but encompasses any variant included in the field of the invention such as defined by the claims.

It has been indicated here that the portable device is a tablet, but another portable device provided with a touch-sensitive screen could be used, for example a smartphone, a portable computer, a smartwatch, etc.

The reference devices and the peripheral devices could be different from those mentioned. It is noted moreover that the reference devices can perfectly comprise one or more peripheral devices, and that the peripheral devices can perfectly comprise one or more reference devices.

It has been mentioned that the communication between the portable device and the selected peripheral device is a transfer of multimedia content. This communication could be a different communication and could, for example, consist of a simple exchange of data, or else of a transfer of multimedia content not from the portable device to the selected peripheral device but from the selected peripheral device to the portable device, etc.

It was described here that the touch-sensitive surface of the portable device was part of a touch-sensitive screen. The touch-sensitive surface could also be a different touch-sensitive surface, for example a touch-sensitive surface of a touch pad.

It was indicated that the triangulation used is a Bluetooth triangulation. Any type of triangulation using radio waves could be used, and notably a Wi-Fi triangulation.

The communication method is not necessarily implemented entirely in the portable device. It could also be implemented, entirely or partially, in another device: server, pod, set-top box, etc.

The invention claimed is:

1. A method for communication between a portable device comprising a touch-sensitive surface and a peripheral device (3k) selected from among at least one peripheral device, comprising:
    a preliminary calibration phase comprising the steps, for each peripheral device (3k), of:
        detecting the said peripheral device (3k);
        acquiring a position (Pk) of the said peripheral device;
        requesting to position the portable device in a calibration position (Tk);
        requesting to carry out a calibration slide with the finger or with the any object, on the touch-sensitive surface of the portable device, in such a way that a direction of the calibration slide (Dk) aims at the said peripheral device;
        acquiring and saving a calibration slide angle ($\theta k$) between the reference direction (N) and the direction of the calibration slide, as well as the calibration position;
    determining a current position (T') of the portable device, and a current orientation of the portable device relative to a reference direction (N);
    determining a direction of a selection slide (D') on the touch-sensitive surface of the portable device, carried out by an individual's finger or by any object, the direction of the selection slide being relative to the reference direction (N);
    defining, from among the at least one peripheral device, by using the calibration slide angles, the calibration positions, the current position (T') as well as the direction of the selection slide (D'), the selected peripheral device (3k) whose position (Pk) corresponds to the direction of the selection slide;
    starting a communication between the portable device and the selected peripheral device (3k).

2. The communication method according to claim 1, wherein the current position (T') of the portable device is determined by triangulation in a frame of reference defined by at least three reference devices.

3. The communication method according to claim 2, wherein the triangulation is a Bluetooth or Wi-Fi triangulation.

4. The communication method according to claim 2, wherein the position of at least one peripheral device is determined by triangulation in the frame of reference.

5. The communication method according to claim 2, wherein the reference devices comprise at least one peripheral device, or else the peripheral devices comprise at least one reference device.

6. The communication method according to claim 2, wherein the reference devices comprise a connected loud speaker and/or a set-top box and/or a residential gateway and/or a home cinema device and/or a hi-fi system and/or a smart television set.

7. The communication method according to claim 1, comprising the step of determining that the position of a peripheral device (3k) corresponds to the direction of the selection slide and therefore that the said peripheral device is the selected peripheral device (3k), when $|\theta 2-\theta 2'|<\varepsilon$, where $\varepsilon$ is a predetermined angular threshold, where:

$$\theta 2 = \arccos(((TkPk)^2 + (T'Pk)^2 - (TkT')^2)/(2*(TkPk)*(T'Pk))),$$

and where:

$$\theta 2' = \theta k - \theta';$$

Tk is the calibration position associated with the said peripheral device (3k);
Pk is the position of the said peripheral device (3k);
TkPk is the segment between Tk and Pk;
T' is the current position of the portable device;
T'Pk is the segment between T' and Pk;
TkT' is the segment between Tk and T';
$\theta k$ is the calibration slide angle associated with the said peripheral device (3k);
$\theta'$ is the selection slide angle between the reference direction and the direction of the selection slide (D').

8. The communication method according to claim 1, wherein the position of at least one peripheral device is determined by positioning the portable device in the immediate proximity of the said peripheral device, and by considering that this position of the portable device corresponds to the position of the said peripheral device.

9. The communication method according to claim 1, wherein the position of at least one peripheral device is determined using a camera positioned for acquiring an image of the peripheral device.

10. A non-transitory computer-readable storage medium storing a computer program comprising instructions for implementing, by a processing component of a portable device, the communication method according to claim 1.

11. A portable device, comprising a processing component in which a communication method according to claim 1 is implemented.

12. The portable device according to claim 11, the portable device being a tablet or a smartphone.

13. The portable device according to claim 11, wherein the touch-sensitive surface is part of a touch-sensitive screen or of a touch pad of the portable device.

* * * * *